United States Patent Office 2,849,130
Patented Aug. 26, 1958

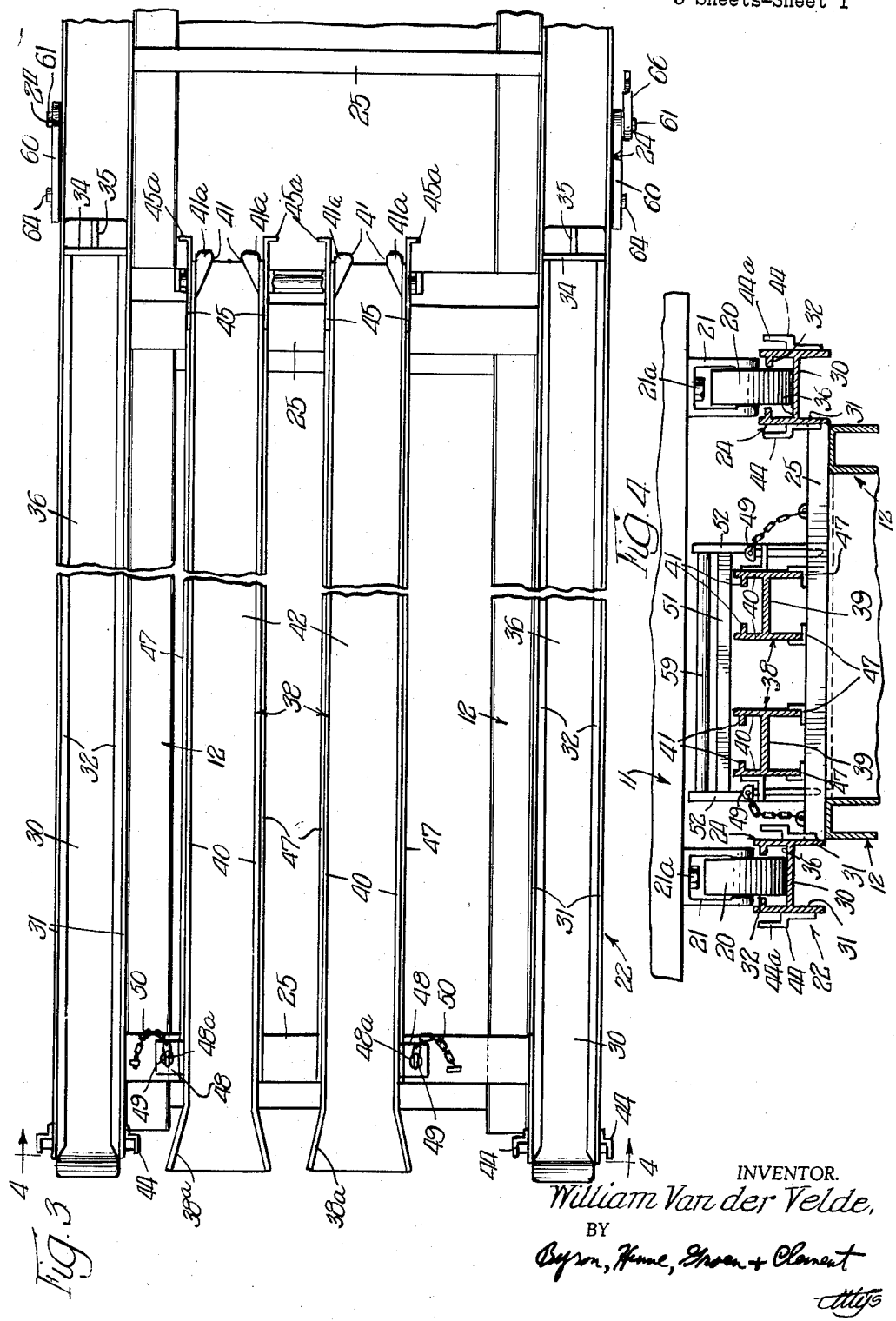

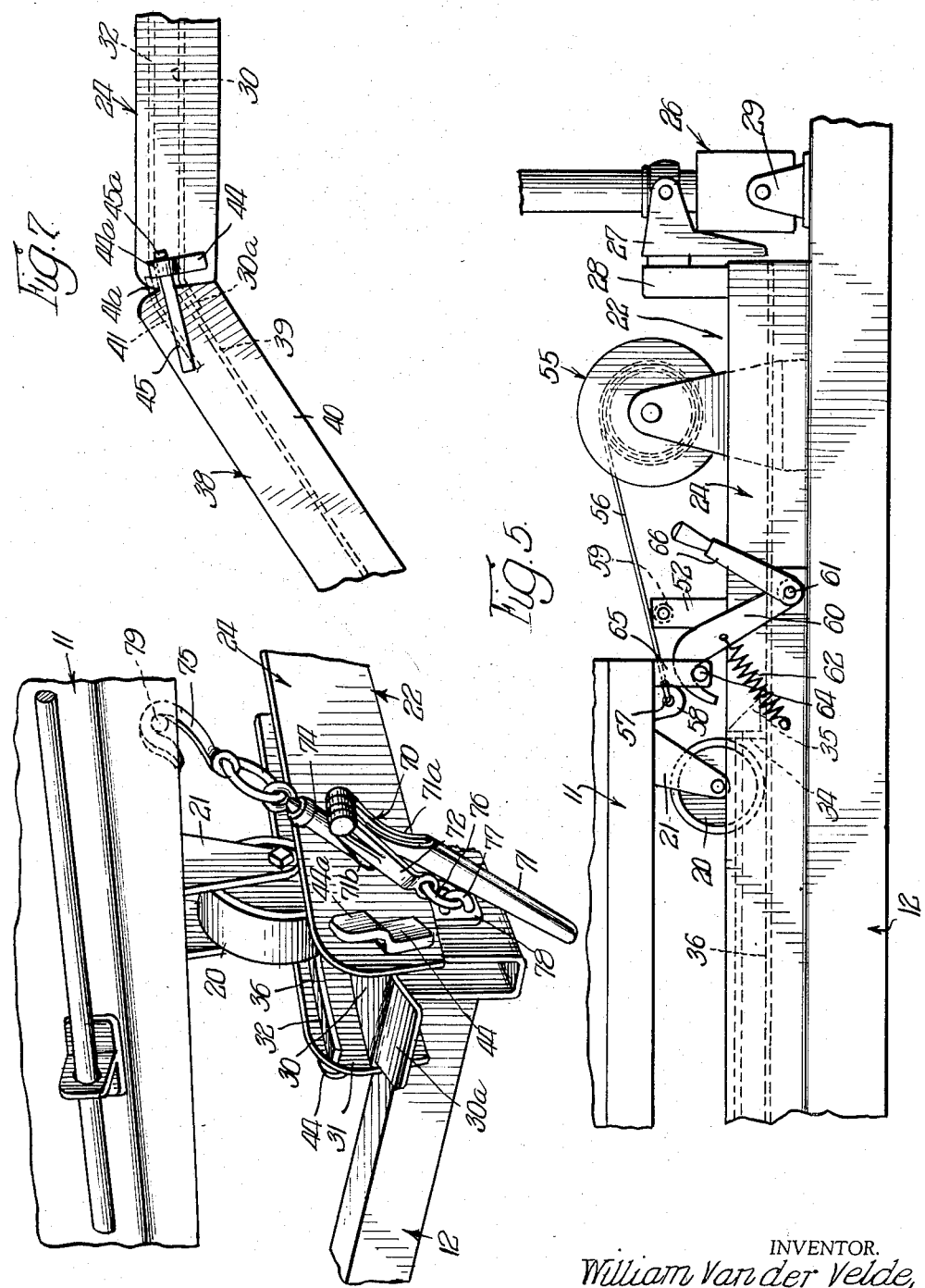

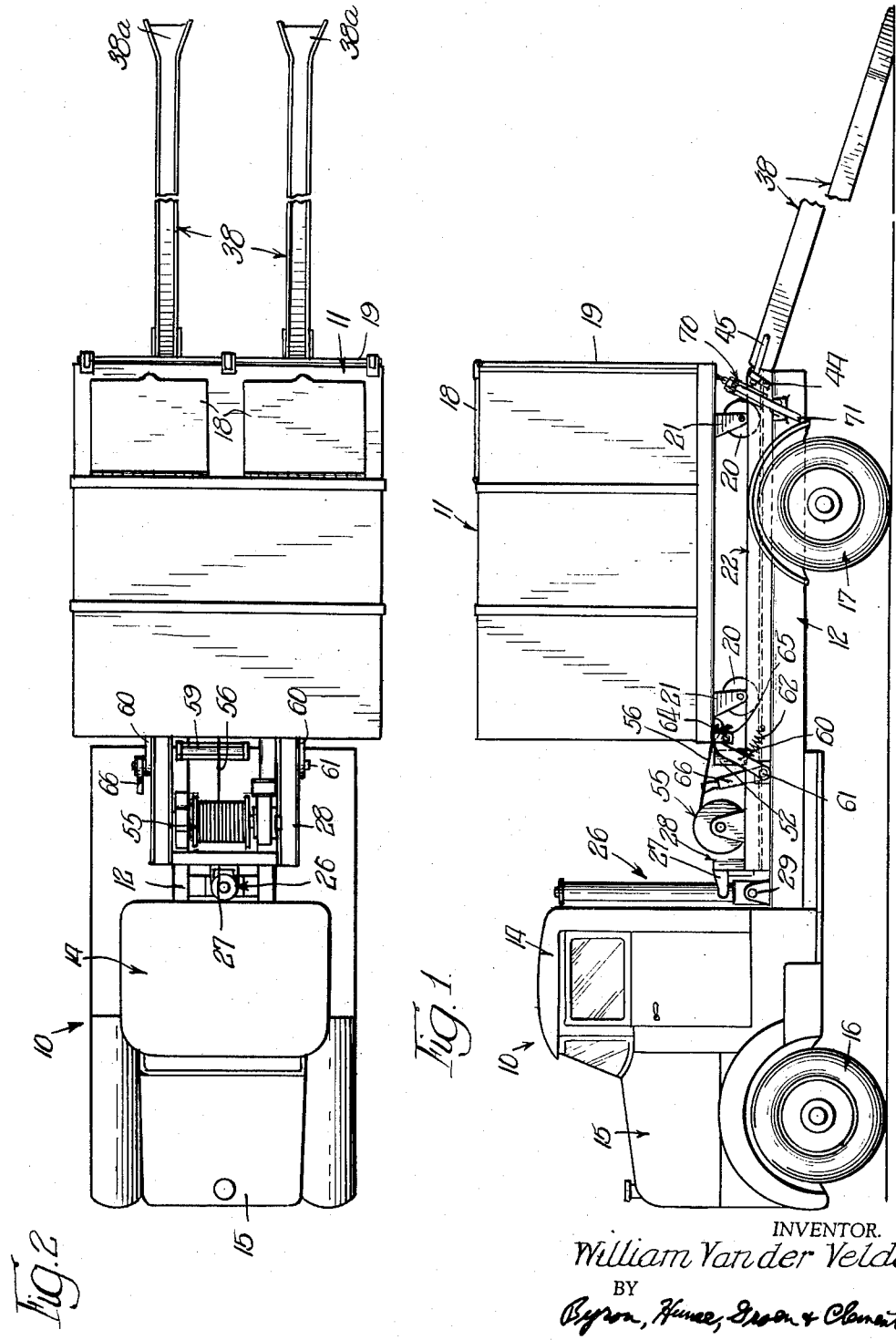

2,849,130

TILTABLE BED HAULING DEVICE

William Van der Velde, Berwyn, Ill.

Application March 12, 1957, Serial No. 645,582

1 Claim. (Cl. 214—85)

This invention relates to an improved hauling device. More particularly, the invention relates to a truck having a dumping bed with a removable container associated with the bed.

It is an object of the present invention to provide a hauling device including improved means for associating and disassociating a container with respect to a truck.

Another object of the invention is to provide a hauling device in which a wheeled container is shiftably mounted on tracks secured to a dump bed of a truck whereby the container may be readily rolled from a stored position on the track to a detached position on a supporting surface.

A further object of the invention is to provide an improved track for use in a hauling device incorporating a wheeled container and a truck with a dump bed.

An additional object of the invention is to provide improved latching means for use in connection with a truck having a removable wheeled container.

Other objects, features and advantages will be apparent from the following description taken in conjunction with the accompanying drawings, in which;

Figure 1 is a side elevational view of a hauling device according to the present invention showing auxiliary unloading tracks in their operative positions;

Figure 2 is a top elevational view of the hauling device shown in Figure 1;

Figure 3 is an enlarged top elevational view of the track and dump bed portion of the hauling device of Figure 1 but showing the auxiliary tracks in their stored positions;

Figure 4 is a fragmentary sectional view taken along line 4—4 of Figure 3 but showing the wheels of the container located in the primary tracks;

Figure 5 is an enlarged fragmentary side elevational view showing the relationship of the dump bed, the primary tracks, the container, the winch and the container latch;

Figure 6 is a fragmentary perspective view showing one of the rear container wheels located in the rear end of one of the primary tracks and also illustrating the latch for securing the rear end of the container to the dump bed; and Figure 7 is a fragmentary side elevational view of one of the primary tracks with an auxiliary track secured thereto.

The hauling device illustrated in Figures 1 and 2 includes a self-propelled truck vehicle 10 having a container 11 removably mounted on the truck. The truck may be of any suitable construction such as that shown including a frame 12 with an operator's cab 14 disposed at the front end behind an engine (not shown) disposed in an engine compartment 15. Steerable front wheels 16 and rear driving wheels 17 are provided in the conventional manner as shown.

The container 11 may be of any desired construction and configuration for containing and transporting any manner of materials. For example, the container 11 may comprise a steel box for receiving refuse. As shown, the box may include closed reinforced sides, top, bottom and front with a pair of covers 18 hinged to the top for closing openings (not shown) for receiving refuse. A reinforced back 19 is hinged at its top edge to the top of the container and is latched at its bottom edge in any suitable manner so that refuse may be readily dumped from the container 11 when it is tilted rearwardly with the latch released. The container is supported on four steel wheels 20 rotatably carried in brackets 21 toward the four corners of the container. The brackets are pivotally castered to the bottom of the box by any suitable means, such as the bolts 21a.

The truck 10 is provided with a dump bed 22 which includes a pair of steel beams of primary tracks 24 and a plurality of steel cross members 25. The tracks 24 are disposed lengthwise of the truck with the cross members welded thereto at right angles. The dump bed 22 is pivotally secured at its rearward end to the rear end of the frame 12 in any suitable manner (not shown), and a hydraulic jack 26 is supported on the frame 12 immediately rearwardly of the cab 14 with the hydraulically actuated piston of the jack pivotally secured to a bracket 27 which is fixedly secured to an upstanding beam 28. The beam 28 is welded to the front cross member 25 of the dump bed. When the hydraulic jack 26 is actuated, it raises the forward end of the dump bed in the conventional manner. As illustrated in Figures 1 and 5, the hydraulic jack 26 is pivotally secured to a bracket 29 which is fixedly secured to the frame 12 so that the jack can tilt to follow the movement of the dump bed as its front end is raised.

As best shown in Figures 3, 4 and 6 the beams 24 are of H cross section each having a central horizontal web 30 connecting a pair of vertically disposed flanges 31. The beams are separated by a distance equal to the tread of the wheels 20 so that the container 11 can be supported on the truck 10 and transported with the wheels resting on the webs of the beams 24. It will be noted that the wheels 20 are considerably narrower than the distance between the flanges 31, and longitudinal guide ribs 32 are integrally formed or secured to the inward opposing faces of the upper portions of the flanges 31 with the distance between the opposed edges of the longitudinal ribs being only slightly greater than the width of the wheels 20, so that the wheels are guided and aligned by the ribs. The ribs 32 extend from the rearward ends of the beams 24 to a location near but short of the forward ends of the beams.

A pair of transverse vertically disposed stop plates 34 are welded in place in the upper channels of the beams at the locations of the forward ends of the guide ribs 32. The stops 34 are adapted to abut the forward wheels 20 of the container 11 to properly position the container on the dump bed, as seen in Figure 5. Triangular brace members 35 are welded in place as shown to help support the stop plates 34.

The upper channels of the beams 24 between the guide ribs 32 form primary track ways 36 which guide and support the wheels 20 of the container 11.

In order to provide for extension of the track ways 36 a pair of auxiliary beams or tracks 38 is provided. The auxiliary beams 38 are similar in cross section to the primary beams 24 and each is provided with a longitudinal central web 39 and a pair of side flanges 40. The auxiliary beams 38 do not have guide ribs, but instead at their forward ends are provided with short lead-in guide ribs 41 which cooperate with the ends of the guide ribs 32 of the tracks 36 to provide a transition between wide auxiliary track ways 42 formed by the upper channels of the auxiliary beams 38 and the narrow primary track ways 36.

When the auxiliary beams 38 are positioned as shown in Figures 1, 2 and 7, they form, in effect, extensions of the primary beams 24 leading from the rear ends of the beams 24 to a loading surface such as the ground as illustrated in Figure 1. Thus, the auxiliary tracks 42 provide extensions for the primary tracks 36.

In order to removably secure the rearward ends of the primary beams 24 to the forward ends of the auxiliary beams 38, attachment brackets 44 are fixedly secured at each side of the rearward end of each of the beams 24 and are provided with outwardly offset portions 44a which are engageable with attachment tongues 45 fixedly secured in complementary positions at the forward ends of the auxiliary beams 38. The attachment tongues at their free ends are provided with outwardly bent locking lugs 45a which prevent endwise separation of the attached beams 24 and 38 when the attachment tongues are engaged with the offset portions 44a of the attachment brackets 44.

As illustrated in Figures 6 and 7, the webs 30 of the beams 24 are formed with rearwardly extending, slightly downwardly bent tongues 30a which underlie the adjacent ends of the webs 39 when the primary beams 24 and the auxiliary beams 38 are connected. The lead-in ribs 41 of the auxiliary beams are provided with forwardly extending tongues 41a which are adapted to overlie the adjacent rearward ends of the guide ribs 32, as illustrated in Figure 7.

When the auxiliary beams 38 are not in use, they are conveniently stored between the primary beams 24 on respective pairs of longitudinally extending angle bars 47 which are properly spaced and welded to the transverse members 25 of the dump bed 22.

Toward their rearward ends the auxiliary beams 38 are provided with attachment angle brackets 48 having vertical apertures 48a adapted to be positioned over corresponding apertures (not shown) through the rear cross member 25 when the beams 38 are in their stored positions as shown in Figure 3. Attachment pins 49 are inserted through the respective aligned apertures in the attachment angles 48 and the transverse member 25 to prevent longitudinal shifting of the auxiliary beams 38. The attachment pins 49 may be loosely secured to the transverse member 25 by means of chains 50 to prevent loss of the pins when the auxiliary beams are in use. The forward ends of the beams 38 are rested on the middle cross member 25 under a keeper bar 51 which is welded to side support members 52, which, in turn, are welded to the dump bed 22.

If the track ways 36 and 42 are aligned as shown in Figures 1 and 2, tilting of the dump bed 22 will allow the container 11 to roll off of the truck onto the unloading surface under the influence of gravity. To control unloading of the container and to permit reloading a winch 55 is secured to the truck frame 12 between the hydraulic jack 26 and the forward end of the container when secured on the truck. The winch 55 controls a cable 56 which is provided with an end hook 57 engageable with an eye lug 58 welded at the bottom edge of the forward end of the container 11. The winch 55 may be power actuated in any suitable manner, such as through drive means (not shown) connecting the winch to the truck motor. The container 11 may thus be unloaded from the truck by tilting the dump bed 22 slightly and then paying out the cable 56 by means of the winch 55 until the container has travelled rearwardly down the tracks. By the same token, the container can be reloaded by pulling in on the cable 56 to pull the container back up the tracks.

A guide rod 59 is secured between the two support brackets 52 above the bar 51 to provide a smooth guide for the cable 56 when the dump bed 22 is pivoted upwardly and the cable is payed out or wound in.

It will be understood that the rearward ends of the auxiliary beams may be rested on any unloading surface which is lower than the rearward ends of the primary beams 24. To facilitate reloading of the container the outward ends of the beams 38 are flared at 38a as illustrated in Figures 2 and 3. The flared ends provide widened leads to the auxiliary tracks 42. The lower legs of the flanges 40 are cut off at an angle below the web 39 at the rearward ends of the auxiliary beams in order that the web ends can rest on the unloading surface.

Automatic latching means are provided for securing the container to the dump bed when the container is rolled into its proper storage position on the truck. Such means comprise a pair of latching hooks 60 which are fixedly secured at the opposite ends of a rod 61 extending through the lower legs of the flanges 31 of the primary beams 24 at right angles thereto, so that the rod is pivotally supported with the hooks disposed in corresponding positions adjacent the outside edges of the beams, as shown. The hooks are resiliently urged to a position substantially as shown in Figure 5 by means of a tension spring 62 connected to one of the hooks and to an adjacent position on the corresponding beam 24. The attachment hooks 60 are adapted to engage respective attachment pins 64 supported between pairs of depending brackets 65 welded to the bottom forward edge portion of the container 11 in spaced transverse positions. The hooks 60 are so constructed and are of such configuration that when the container 11 is rolled along the tracks toward the stop plates 34, the attachment pins 64 will strike the noses of the hooks 60 to pivot the hooks in a clockwise direction as seen in Figure 5, until the noses of the hooks can ride over the pins 64 allowing the hooks to pivot in a counterclockwise direction into latched positions over the pins, as illustrated. When the hooks are secured, it will be seen that rearward movement of the container 11 is prevented. The latching hooks 60 may be released by means of a handle 66 which is welded to one of the hooks 60. When the handle 66 is moved in a clockwise direction as seen in Figure 5 the hooks 60 are released from the pins 64 to permit rearward movement of the container 11.

In order to secure the rear end of the container 11 when the truck 10 is driven over bumps or the like, manual latches 70 are provided at the rearward ends of both of the beams 24, as illustrated in Figure 6. The latches are in the form of over-center toggle linkages each including an actuating handle 71 with a two-pronged forked end portion 71a pivotally secured at its end to the end of a U-bracket 72. An offset portion 71b of the forked end 71a is pivotally connected to a strap 74 which in turn is swivelly connected to a hook 75. The free end of the U-bracket 72 is connected by means of a ring 76 to a bracket 77 formed on a lug 78 welded to the beam 24. Each of the hooks 75 is adapted for engaging respective pins 79 fixedly secured to the bottom of the rear edge portion of the container 11. When the toggle latches 70 are in their over-center, locked positions, as shown in Figure 6, the rear end of the container is firmly connected to the dump bed. The latches 70 may be readily released by moving the handle 71 upwardly to release the linkage from its over-center position to permit the strap 74 to be moved longitudinally with respect to the U-bracket 72 so that the hook 75 can be released from the locking lug 79.

The container 11 is securely stored on the dump bed 22 of the truck when the latches 60 and 70 are engaged. The latches firmly position the container as illustrated in Figures 1 and 2 even when the dump bed is tilted rearwardly the maximum amount to dump material out the rear end of the container.

If it is desired to unload the container itself, the dump bed may be tilted slightly with the latches 60 and 70 released and with the auxiliary beams 38 positioned as shown in Figures 1 and 2. The container then rolls down the primary track ways 36 and the auxiliary track ways 42 as the cable 56 is payed out by the winch 55. After the container has been unloaded another container of the same type, or of any configuration utilizing similar wheels 20 of the same span, can be loaded on the truck and the new container secured in place for transport. In loading a container, the cable 56 is wound in by the winch 55, drawing the container toward the truck and then up the auxiliary track ways 42 into transporting position on the primary track ways 36. Before the truck is driven with the newly loaded container the auxiliary track beams 38 are stored and secured as illustrated in Figure 3 and the rear latches 70 are secured. As was explained previously, the forward latches 60 will automatically engage when the container is moved into its proper transport position.

The castered wheels cooperate with the track ways to greatly facilitate loading and unloading. When the wheels are retained in the primary track ways they are prevented from castering by the close association of the guide ribs 32 so that the container is firmly and positively supported on the dump bed when the latches are engaged. The castered wheels supporting the container are also useful for moving the container from place to place on the unloading surface.

The auxiliary track ways 42 are substantially wider than the primary track ways 36 and the rearward ends are substantially flared as described in order to facilitate loading of the container, while the lead-in ribs 41 at the forward ends of the auxiliary track ways properly thread the wheel frame into the narrow primary track ways.

Of course, it will be understood that containers 11 may be of widely different configurations for widely different uses, the only restriction being that the castered wheels 20 be of a standard size and standard gauge. Thus, the truck 10 can be utilized for practically any type of transport or hauling and one truck may be efficiently utilized to separately transport a plurality of containers of different configurations.

Variations and modifications may be effected without departing from the scope of the novel concepts of the present invention.

I claim:

In a hauling device including a self-propelled truck having a frame with a power-actuated rear-tilting dumping bed, the improvement comprising a pair of transversely spaced tracks mounted on said bed and generally parallel to the plane of tilting of the bed, a removable container having a plurality of rotatably secured castered wheels disposed for rolling in said track ways and for supporting said container thereon, each of said track ways including a pair of internal longitudinally disposed guide ribs spaced slightly wider than the width of said wheels whereby said wheels are accurately guided and supported on the track ways, selectively releasable latch means operatively associated with said track ways and said container for securing said container in a stored position on said track ways, a pair of auxiliary track ways normally stored on said bed between said spaced track ways, said auxiliary track ways being substantially wider than the distance between the respective pairs of guide ribs on said spaced track ways, means for selectively securing one end of each of said auxiliary track ways to the respective outer ends of said spaced track ways with the other ends of the auxiliary track ways resting on a loading surface, and lead-in guide ribs formed at said one end of each of said auxiliary track ways and operatively associated with said guide ribs of said spaced track ways to provide a transition between the track ways, said other ends of the auxiliary track ways being flared to provide widened leads into the auxiliary track ways to facilitate rolling said wheels into said auxiliary track ways from the loading surface, whereby said auxiliary track ways form removable extensions for shifting said container on said track ways between said stored position and the loading surface.

References Cited in the file of this patent

UNITED STATES PATENTS

| 2,613,827 | Van Doorne | Oct. 14, 1952 |
| 2,705,081 | Jacobs | Mar. 29, 1955 |
| 2,789,715 | Filipoff et al. | Apr. 23, 1957 |

FOREIGN PATENTS

| 849,376 | Germany | Sept. 15, 1952 |